United States Patent [19]

Krenzer

[11] 3,909,230

[45] Sept. 30, 1975

[54] METHOD FOR THE CONTROL OF AQUATIC PLANT LIFE

[75] Inventor: John Krenzer, Oak Park, Ill.

[73] Assignee: Velsicol Chemical Corporation, Chicago, Ill.

[22] Filed: May 14, 1974

[21] Appl. No.: 462,001

[52] U.S. Cl. ........................................... 71/66; 71/67
[51] Int. Cl.² ............................................. A01N 9/00
[58] Field of Search ........................... 71/92, 66, 67

[56] References Cited
UNITED STATES PATENTS 3,437,664   4/1969   Krenzer ................................. 71/92
3,773,492   11/1973   Fischer ................................. 71/92

Primary Examiner—James O. Thomas, Jr.
Attorney, Agent, or Firm—Robert J. Schwarz; Dietmar H. Olesch

[57] ABSTRACT

This invention discloses a method for the control of aquatic plant life which comprises contacting said plant life, or its locus, with a toxic amount of the compound 2-(3,4-dichlorophenyl)-4-methyl-1,2,4-oxadiazolidine-3,5-dione.

5 Claims, No Drawings

METHOD FOR THE CONTROL OF AQUATIC PLANT LIFE

This invention relates to the control of aquatic pests and in particular relates to the control of undesirable aquatic plant life.

Aquatic plants cause a variety of problems in lakes, ponds, streams, irrigation systems, drainage canals, and in the cultivation of certain field crops. Thus in the recreational uses of water aquatic plants interfere with swimming and fishing, foul outboard motors and often impart undesirable flavors and odors to the water. In streams, irrigation systems and drainage canals aquatic plants interfere with the flow of water, effect increased evaporation and seepage, and cause clogging of structures; while in the cultivation of such field crops as rice, aquatic plants compete for soil nutrients and sunlight resulting in considerable reductions of yields. While many mechanical methods for the control of undesirable aquatic plant life have been proposed and used in the past, such as dredging, underwater mowing, hand cleaning and chaining, only partial success has been obtained. In recent years there has been an increased interest in the chemical control of aquatic plants and as a result a few chemical compounds which are effective in controlling some of the undesirable aquatic plants have been discovered.

It is surprising, however, in view of the vast number of herbicidally active compounds which are known, only a limited number of chemical compounds exhibiting activity towards aquatic plant life have been found. In a study by Frank et al. 1963 Weeds 11: 124–128, wherein ninety-one herbicides were tested for aquatic activity, it was found that little or no correlation between herbicidal activity toward terrestial vegetation and activity for the control of aquatic plant life exists.

In view of the aquatic weed problem and the limited development of chemical compounds which can be used to control such weeds it is readily apparent that additional compounds and compositions useful for this purpose are urgently required.

It has now been discovered that the compound 2-(3,4-dichlorophenyl)-4-methyl-1,2,4-oxadiazolidine-3,5-dione possesses unexpected activity for the control of aquatic plant life.

Thus, one embodiment of the present invention resides in a method for the control of aquatic plant life which comprises applying to the aquatic plant life, or its locus, a composition comprising an inert carrier, and as an essential active ingredient, in a quantity toxic to aquatic plant life, the compound 2-(3,4-dichlorophenyl)-4-methyl-1,2,4-oxadiazolidine-3,5-dione.

For practical use in controlling aquatic plant life, the active compound of this invention, 2-(3,4-dichlorophenyl)-4-methyl-1,2,4-oxadiazolidine-3,5-dione, can be formulated into compositions which comprise an inert carrier or a diluent and a toxic amount of the compound. Such compositions, which can also be called formulations, enable the active compound to be applied conveniently to the site of the aquatic weed infestation in any desired quantity. These compositions can be liquids such as solutions or emulsifiable concentrates, or solids such as granules, wettable powders or pellets.

Solutions of the active compound of this invention can usually be prepared by dissolving the compound in a common organic solvent such as kerosene, xylene, acetone, methanol or the like.

Emulsifiable concentrates comprise the active compound of this invention, a solvent and an emulsifier. An inert solvent capable of dissolving the active compound can be used. In some instances, however, it can be advantageous to use a solvent which itself exhibits some activity for the control of aquatic weeds. Aromatic solvents derived from coal tar and petroleum are of this type. The emulsifiers most commonly used are nonionic or mixtures of nonionic with anionic surface active agents.

Solid formulations such as granules can be prepared by impregnating the active compound, usually dissolved in a suitable solvent, onto and into granulated carriers such as the attapulgites or the vermiculites usually of a particle size range of from about 0.3 to about 5 mm. For example, a typical granular formulation can be prepared by charging absorbent granules into a tumbler mixer and then applying a solution of the active compound in the form of a fine spray until the desired concentration of active ingredient is obtained.

Wettable powders consist of admixtures of finely divided powders of an inert carrier, such as talc, clay, silica, pyrophyllite and the like and the active compound, to which wetting agents have been added. Such formulations are usually prepared by grinding and blending the ingredients until a free flowing dust of the desired particle size is obtained.

Pelletized formulations consist of the active compound, a solid inert carrier and a binding agent. Suitable binding agents are hardenable materials, such as vinyl chloride-vinyl acetate copolymers, hydrocarbon resins, alkyd resins, drying oil, resin esters, varnishes, phenolic resins, and any of the film forming polymeric materials commonly used in the paint industry. Pellets are usually prepared by mixing the active compound, the inert carrier and the binding agent which can be in a solution form, until a paste results. This paste is then extruded into pellets of any desired size or shape and is then hardened by evaporating the solvent, heat curing the polymeric material or other methods as required. Such pelletized formulations often have the advantage of releasing the active ingredient at a controlled rate resulting in better and longer lasting control of aquatic plants.

The concentration of the active compound of this invention in the various formulations will vary greatly with the type of formulation and the purpose for which it is designed; but generally the formulations will contain from about 0.05 to about 95 percent by weight of the active compound of this invention.

The compositions of this invenntion can be applied to the site of the aquatic plant life infestation in a manner recognized by the art. One method for the control of aquatic plant life comprises contacting said plant life with a toxic amount of the compound of this invention or a composition which comprises a carrier and the active compound of this invention. Another method for the control of aquatic plant life comprises contacting the water in which said plant life grows with a toxic amount of the compound or composition heretofore described. Yet another method comprises treating the soil in which aquatic weeds grow with a described composition.

Undesirable aquatic plant life usually consists of algae and aquatic weeds. Such plants have no economic value and interfere with the utilization of the waters in which they grow.

While there is a vast number of known algae, the more common ones can be classified into four major groups as blue-green algae which include such forms as Oscillatoria, Anacystis and Desmonema; the green algae such as Chlorella, Pediastrum, Spyrogyra and Chlamydomonas; the diatoms such as Cyclotella and Navicula; and the pigmented flagellates such as Euglena and Synura.

Aquatic weeds are undesirable plants which normally start in water and grow at least part of their life cycle in water. These weeds can be classified into submerged weeds, emergent weeds, marginal weeds and floating weeds. Among the submerged weeds, or those which primarily spend their life cycle below the surface of water, are fanwort, waterstarworts, coontail, needlerush, spikerush, elodea, dense waterweed, Western waterweed, water stargrass, St. Johns-worts, waterprimrose, watermilfoil, parrots feather, naiads, pondweed, wrinkled-leaf pondweed, fine-leafed pondweed, leafy pondweed, American pondweed, sago pondweed, Richardson's pondweed, bladderworts, eelgrass, horned pondweed, whitestem pondweed, giant pondweed, waterbuttercup, ducksalad and waterplantain. Among the emergent weeds, or those aquatic weeds which send stems and leaves above the water surface, are watershield, watercress, spatterdock, waterlilies, waterparsley, arrowarum, waterlettuce, white watercrowfoot and water chestnut. Marginal weeds are those aquatic plants which grow at the edge of lakes, ponds, streams and canals or in relatively shallow waters. Among this type are cattails, sweetflag, alders, Mexican-weed, Oregon sugargrass, sedge, waterwillow, saltgrass, spikerush, horsetail, rosemallow, pennywort, rushes, cutgrass, lotus, goldenclub, maidencane, paragrass, knotgrass, reedgrass, waterpepper, pickerelweed, marshmarigold, arrowhead, bulrushes, saltgrass, woolgrass, burreed, cardgrass, gooseweed, saltcedar and giant cutgrass. Examples of floating weeds are waterhyacinth, duckweed, waterfern, alligatorweed, big duckweed, and watermeals.

The quantity of active compound required to control aquatic plant life is dependent on a variety of factors such as the hardiness of the particular plant species, method of application, depth and flow of water, density of phytoplankton, temperature, water hardness, pH and the like. Generally, a rate of from about 0.05 to about 50 lb. of active compound per acre or, a concentration of about 0.1 to about 100 ppm in the water in which the weeds are growing can be required for good control of aquatic weeds. For example, to control submerged plants in static water a concentration of only about 5 ppm or less can be sufficient, however, to control the same plants in rapidly moving water a concentration of up to 100 ppm may be required.

The active compound of the present invention is also useful when combined with other aquatic herbicides in the compositions heretofore described. These other materials can comprise from about 5 to about 95 percent of the active ingredients in the compositions. Use of combinations of these other aquatic herbicides with the compound of this invention often provides compositions which are more effective than separate compositions of the individual compounds. The other aquatic herbicides with which the compounds of this invention can be combined include such compounds as copper sulfate, sodium arsenite, acriflavin, acrolein, alum, amitrol, ammonium sulfamate, sodium chlorate, atrazine, benzenehexachloride, CDEA, chlorinated benzene, 2,4-D, dalapon, dichlone, diquat, diuron, DNBP, DNC, DNCHP, 2,3-DNQ, dichloropropionic acid, erbon, fenac, fenuron, ferbam, hexachloroacetone, IPC, potassium permanganate MCPA, maleic hydrazide, monuron, colloidal silver, polychlorobenzoic acid, neburon, trichloroacetic acid, pentachlorophenol, pyridylmercuric acetate, 2,3-dichloronaphthaquinone, silvex, simazine, 2,4,5-T, TBA, trichloroacetic acid, trichlorobenzene, trichloroethylene potassium azide and ziram.

Such compounds can also be used in the form of their salts, esters, amides and other derivatives whenever applicable to the particular parent compound.

The effectiveness of the compound of the present invention in controlling algae was demonstrated in experiments wherein the algaecidal activity against Chlamydomonas was determined at various concentrations of active compound. These experiments were carried out by placing the algae species into separate paper cups containing 225 ml of water, 150 mg of granular fertilizer and the 2-(3,4-dichlorophenyl)-4-methyl-1,2,4-oxadiazolidine-3,5-dione formulated as an aqueous dispersion of an acetone solution at the indicated concentrations. The cups were then placed in a greenhouse where they were maintained at a temperature of 80°F during a 15-hour daylight period and at 70°F during a 9-hour dark period. The water level in the cups was maintained daily. After a period of 7 days the growth inhibition of the algae was determined and rated on a percent basis as compared to untreated controls. The results of this experiment are given in the following table.

| CONTROL OF CHLAMYDOMONAS | |
|---|---|
| PPM | % Control |
| 1.39 | 86 |
| 2.78 | 96 |
| 5.56 | 100 |
| 11.125 | 100 |
| 22.25 | 100 |
| 50.00 | 100 |
| 100.00 | 100 |

I claim:

1. A method for the control of aquatic plant life which comprises applying to the aquatic plant life a composition comprising an inert carrier, and as an essential active ingredient, in a quantity toxic to aquatic plant life, the compound 2-(3,4-dichlorophenyl)-4-methyl-1,2,4-oxadiazolidine-3,5-dione.

2. The method of claim 1, wherein the composition is incorporated into the water containing the aquatic plant life at a rate of 0.1 to 100 parts by weight of 2-(3,4-dichlorophenyl)-4-methyl-1,2,4-oxadiazolidine-3,5-dione per million parts of water.

3. The method of claim 1 wherein the aquatic plant life is aquatic weeds.

4. The method of claim 1 wherein the aquatic plant life is algae.

5. The method for the control of algae which comprises incorporating into the water containing said algae from 0.1 to 100 parts by weight of 2-(3,4-dichlorophenyl)-4-methyl-1,2,4-oxadiazolidine per million parts of water.

* * * * *

UNITED STATES PATENT OFFICE
CERTIFICATE OF CORRECTION

PATENT NO. : 3,909,230
DATED : September 30, 1975
INVENTOR(S) : John Krenzer

It is certified that error appears in the above-identified patent and that said Letters Patent are hereby corrected as shown below:

In column 1, line 35, for "terrestial" read -- terrestrial -- .

In Claim 5, column 4, line 66, for "dichlorophenyl)-4-methyl-1,2,4-oxadiazolidine" read -- dichlorophenyl)-4-methyl-1,2,4-oxadiazolidine-3,5-dione -- .

Signed and Sealed this sixth Day of January 1976

[SEAL]

Attest:

RUTH C. MASON
Attesting Officer

C. MARSHALL DANN
Commissioner of Patents and Trademarks